(12) United States Patent
Higuchi (10) Patent No.: US 7,730,718 B2
(45) Date of Patent: Jun. 8, 2010

(54) CONTROL SYSTEM FOR INTERNAL COMBUSTION ENGINE

(75) Inventor: Kazuhiro Higuchi, Ichinomiya (JP)

(73) Assignee: Denso Corporation, Kariya (JP)

( * ) Notice: Subject to any disclaimer, the term of this patent is extended or adjusted under 35 U.S.C. 154(b) by 509 days.

(21) Appl. No.: 11/709,781

(22) Filed: Feb. 23, 2007

(65) Prior Publication Data
US 2007/0214774 A1    Sep. 20, 2007

(30) Foreign Application Priority Data
Mar. 14, 2006    (JP)    ............................... 2006-069807

(51) Int. Cl.
*F01N 3/00*    (2006.01)
(52) U.S. Cl. .............................. 60/285; 60/274; 60/277; 60/286; 60/297; 60/300; 123/697
(58) Field of Classification Search .................. 60/274, 60/277, 285, 286, 295, 297, 300; 123/697
See application file for complete search history.

(56) References Cited

U.S. PATENT DOCUMENTS

| | | | |
|---|---|---|---|
| 5,544,639 A * | 8/1996 | Shouda et al. .............. | 123/676 |
| 7,152,392 B2 * | 12/2006 | Kuboshima et al. ........... | 60/277 |
| 7,243,491 B2 * | 7/2007 | Okugawa et al. .............. | 60/311 |
| 7,254,940 B2 * | 8/2007 | Saitoh et al. .................. | 60/295 |
| 7,337,772 B2 * | 3/2008 | Yasui et al. .................. | 123/697 |
| 7,418,322 B2 * | 8/2008 | Kariya et al. .................. | 701/34 |
| 7,458,206 B2 * | 12/2008 | Yahata et al. .................. | 60/297 |
| 2004/0123586 A1 | 7/2004 | Kuboshima et al. | |
| 2004/0226288 A1 | 11/2004 | Okugawa et al. | |
| 2005/0102076 A1 | 5/2005 | Kariya et al. | |

FOREIGN PATENT DOCUMENTS

DE    196 29 552 C1    12/1997
JP    2004-245109    9/2004

OTHER PUBLICATIONS

Office Action dated Dec. 21, 2009 issued in corresponding German Application No. 10 2007 000 146.2-13 with an at least partial English-language translation thereof.
Professor Dr.-Ing. Holger Lutz et al., "Taschenbuch der Regelungstechnik", 2002 with an at least partial translation thereof.

* cited by examiner

*Primary Examiner*—Binh Q Tran
(74) *Attorney, Agent, or Firm*—Nixon & Vanderhye P.C.

(57) ABSTRACT

A control system for an internal combustion engine includes an exhaust gas purifying device, an exhaust gas temperature sensor, and temperature estimating device. The exhaust gas purifying device is provided to an exhaust duct of the internal combustion engine. The exhaust gas temperature sensor is provided in the exhaust duct on an upstream side of the exhaust gas purifying device. The temperature estimating device estimates a first exhaust gas temperature on a downstream side of the exhaust gas purifying device through a transfer function, which is expressed by a plurality of identical first-order lag elements, based on a second exhaust gas temperature on the upstream side of the exhaust gas purifying device sensed by the exhaust gas temperature sensor.

9 Claims, 6 Drawing Sheets

CONTROL SYSTEM FOR INTERNAL COMBUSTION ENGINE

CROSS REFERENCE TO RELATED APPLICATION

This application is based on and incorporates herein by reference Japanese Patent Application No. 2006-69807 filed on Mar. 14, 2006.

BACKGROUND OF THE INVENTION

1. Field of the Invention

The present invention relates to a technology, which estimates an exhaust gas temperature of one of an upstream side and a downstream side of an exhaust gas purifying device based on an exhaust gas temperature of the other one of the upstream side and the downstream side, in a control system for an internal combustion, which includes the exhaust gas purifying device.

2. Description of Related Art

For example, in a diesel engine, there is provided a diesel particulate filter (DPF) as an exhaust gas purifying device for capturing particulate matters (PM) in exhaust gas. Because the captured PM is accumulated in the DPF, a DPF regeneration control is regularly performed in order to burn and remove the PM. When a temperature of the DPF rises too high in the DPF regeneration control, the DPF may disadvantageously deteriorate. Therefore, an exhaust gas temperature sensor is provided on an upstream side of the DPF, and in the DPF regeneration control, a combustion state in the DPF is adjusted based on the exhaust gas temperature on the upstream side of the DPF sensed by the exhaust gas temperature sensor.

An air-fuel ratio sensor, which senses an oxygen concentration (air-fuel ratio) in the exhaust gas, is provided on the downstream side of the DPF. The air-fuel ratio sensor includes, for example, a sensor element made of a solid electrolyte of zirconia, and the sensor element is kept at a predetermined activation temperature (e.g., 750° C.) such that a temperature detection signal, which corresponds to the oxygen concentration, is outputted. The sensor element internally has a heater, and when the heater generates heat by energization, the sensor element is heated such that the activation state can be maintained.

The oxygen concentration detected by the above air-fuel ratio sensor and a energization amount for energizing the heater of the air-fuel ratio sensor are influenced by exhaust gas heat of therearound to vary. Thus, an exhaust gas temperature sensor is provided on the downstream side of the DPF (e.g., near the air-fuel ratio sensor), and the influence by the exhaust gas heat is compensated based on the exhaust gas temperature on the downstream side of the DPF sensed by the exhaust gas temperature sensor. Also, when an engine is started in cold (i.e., when a cold start is made), moisture in the exhaust gas may be condensed such that condensed water may be generated. Then, when the condensed water is applied to the sensor element heated by the heater, the sensor element may be disadvantageously broken. Therefore, it is determined whether or not there is condensed water in an exhaust pipe (i.e., a wet-and-dry state is determined) based on the exhaust gas temperature on the downstream side of the DPF sensed by the exhaust gas temperature sensor. In accordance with the determination result, it is determined whether the heater is energized or not.

As described above, it is indispensable to know the exhaust gas temperature on the upstream side and the downstream side of the DPF in order to protect the DPF in the DPF regeneration control, and also in order to improve degree of detection accuracy of the air-fuel ratio sensor. In other words, exhaust gas temperature sensors need to be provided on the upstream side and the downstream side of the DPF, respectively, to sense corresponding exhaust gas temperatures. However, from a view point of cost reduction, the number of the exhaust gas temperature sensors needs to be reduced.

In order to solve the above disadvantages, there is disclosed a technology, where an exhaust gas temperature, which is sensed by an exhaust gas temperature sensor provided on one of the upstream side and the downstream side the DPF, is used to estimate an exhaust gas temperature of the other one of the upstream side and the downstream side. For example, in JP-A-2005-140069, a temperature change in the DPF is modeled by a transfer function, which is expressed by "first-order lag+dead time", and the temperature is estimated based on the model. In JP-A-2005-245109, similarly to JP-A-2005-140069, a transfer function, which is expressed by "n-th order lag+dead time" is used to model a temperature change in the DPF. However, each of these transfer functions is expressed by an approximate expression, which is experimentally computed, and therefore, a degree of estimation accuracy may not be disadvantageously sufficient.

SUMMARY OF THE INVENTION

The present invention is made in view of the above disadvantages. Thus, it is an objective of the present invention to address at least one of the above disadvantages.

To achieve the objective of the present invention, there is provided a control system for an internal combustion engine, the control system including an exhaust gas purifying device, an exhaust gas temperature sensor, and temperature estimating means. The exhaust gas purifying device is provided to an exhaust duct of the internal combustion engine. The exhaust gas temperature sensor is provided in the exhaust duct on an upstream side of the exhaust gas purifying device. The temperature estimating means estimates a first exhaust gas temperature on a downstream side of the exhaust gas purifying device through a transfer function, which is expressed by a plurality of identical first-order lag elements based on a second exhaust gas temperature on the upstream side of the exhaust gas purifying device sensed by the exhaust gas temperature sensor.

To achieve the objective of the present invention, there is also provided a control system for an internal combustion engine, the control system including an exhaust gas purifying device, an exhaust gas temperature sensor, and temperature estimating means. The exhaust gas purifying device is provided to an exhaust duct of the internal combustion engine. The exhaust gas temperature sensor is provided in the exhaust duct on a downstream side of the exhaust gas purifying device. The temperature estimating means estimates a first exhaust gas temperature on an upstream side of the exhaust gas purifying device through a function based on a second exhaust gas temperature on the downstream side of the exhaust gas purifying device sensed by the exhaust gas temperature sensor. The function is an inverse transfer function of a transfer function that is expressed by a plurality of identical first-order lag elements. The transfer function is used for estimating the second exhaust gas temperature based on the first exhaust gas temperature.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

One embodiment of the present invention will be described with reference to the accompanying drawings. In the present embodiment, an engine control system is structured for a multiple cylinder diesel engine. In the engine control system, an electronic control unit (ECU) acts as a center to execute an intake air flow control, a fuel injection control, and the like. Firstly, FIG. 1 is used to describe and entire schematic structure of the present engine control system.

Figure 1:
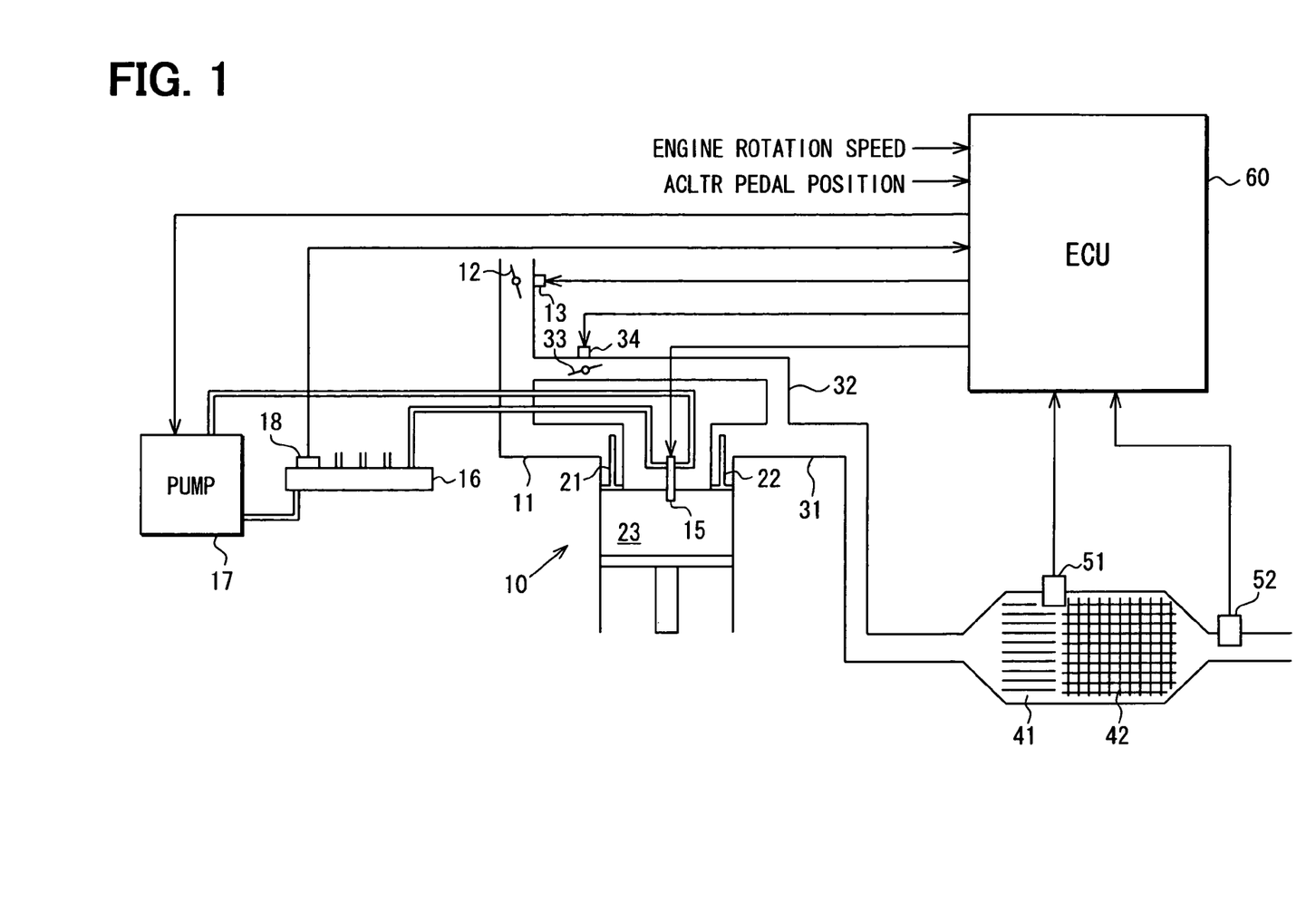
FIG. 1 is a schematic view of an engine control system.

In an engine 10 shown in FIG. 1, an intake pipe 11 is provided with a throttle valve 12, and an opening of the throttle valve 12 is adjusted by a throttle actuator 13 made of a DC motor. The intake pipe 11 branches at a downstream of throttle valve 12 to connect with an intake port of each cylinder of the engine 10.

In the engine 10, an injector 15 is provided to each cylinder, and the injector 15 is connected to a common rail 16, which is common for each cylinder. The common rail 16 is connected with a high-pressure pump 17, and fuel is pumped from a fuel tank (not shown) by driving the high-pressure pump 17. Thus, high-pressure fuel is continuously accumulated in the common rail 16. The common rail 16 is provided with a common rail pressure sensor 18, and the common rail pressure sensor 18 detects fuel pressure in the common rail 16.

An intake port and an exhaust port of the engine 10 are provided with an intake valve 21 and an exhaust valve 22, respectively. Intake air is introduced into a combustion chamber 23 by opening the intake valve 21, and is used for combustion along with the fuel injected by the injector 15. Exhaust gas after the combustion is discharged to an exhaust pipe 31 by opening the exhaust valve 22.

A part of the exhaust gas discharged to the exhaust pipe 31 is recirculated to an intake system as an exhaust gas recirculation (EGR) gas by an exhaust gas recirculation device (EGR device). In other words, an EGR pipe 32 is provided between the downstream side of the throttle valve 12 of the intake pipe 11 and the exhaust pipe 31. The EGR pipe 32 is provided with an EGR cooler (not shown) to cool the EGR gas. An EGR valve 33 is provided near a connection between the EGR pipe 32 and the intake pipe 11, such that the EGR gas flow is adjusted by opening and closing the EGR valve 33 through an EGR actuator 34. The above EGR apparatus recirculates the EGR gas into the intake system such that combustion temperature decreases to limit nitrogen oxides (NOx) generation.

A diesel oxidation catalyst (DOC) 41 and a diesel particulate filter (DPF) 42 are provided downstream of the exhaust pipe 31. The DPF 42 is made by molding heat-resistant ceramic (e.g., cordierite) into a honeycomb structure to capture particulate matters (PM) in the exhaust gas.

An exhaust gas temperature sensor 51 is provided at an upstream side of the DPF 42 to sense exhaust gas temperature, and an air-fuel ratio sensor 52 is provided at a downstream side of the DPF 42 to sense an oxygen concentration (air-fuel ratio) in the exhaust gas. The air-fuel ratio sensor 52, for example, includes a sensor element (sensor element part) made of a solid electrolyte, such as zirconia. Here, the sensor element is kept at a predetermined activation temperature (e.g., 750° C.), and a temperature detection signal is outputted correspondingly to an oxygen concentration of the time. The sensor element has a heater, which generates heat when energized and heats the sensor element. Thus, an activation state of the sensor element can be retained. Here, an energization amount for energizing the heater is adjusted by a PWM control, and is determined based on a heater energization Duty ratio.

As is well known, an electronic control unit (ECU) 60 is mainly structured by a microcomputer, which includes a CPU, a ROM, and a RAM. The ECU 60 receives detection signals from the common rail pressure sensor 18, the exhaust gas temperature sensor 51 and the air-fuel ratio sensor 52 as data indicating an operational state of the engine 10. Also, the ECU 60 additionally receives operational data, such as an engine rotation speed and an accelerator pedal position. Thus, the ECU 60 executes various control programs stored in the ROM to perform various controls of the engine 10, such as intake air flow control and the fuel injection control, based on the operational data received at the time.

Because the captured PM is gradually accumulated in the DPF 42, the accumulated PM needs to be appropriately removed. Therefore, in the present engine control system, a post injection and a rich purge are performed as a DPF regeneration control to supply uncombusted fuel into the DOC 41. In this way, reaction heat is generated in the DOC 41 to increase temperature of the DPF 42, and then, the PM accumulated in the DPF 42 is burned and removed. When the temperature in the DPF 42 excessively rises during the DPF regeneration control, the DPF 42 may be degraded. Therefore, an exhaust gas temperature in the DPF 42 needs to be known and be adjusted based on an exhaust gas temperature on the upstream side of the DPF 42 detected by the exhaust gas temperature sensor 51.

Also, when the oxygen concentration is detected by the sensor element of the air-fuel ratio sensor 52, the detected value may be influenced by the exhaust gas heat. Therefore, an exhaust gas temperature on the downstream side of the DPF 42 needs to be obtained as an exhaust gas temperature near the air-fuel ratio sensor 52, and also the detected value needs to be corrected in accordance with the obtained exhaust gas temperature. Further, when the heater energization control is executed for keeping the sensor element of the air-fuel ratio sensor 52 under the activation temperature, heater energization Duty ratio is determined based on a difference between an actual element temperature of the sensor element and the target activation temperature. In this case, the heater energization Duty ratio needs to be corrected because the element temperature of the sensor element gets the influence of the exhaust gas heat and is changed.

In order to achieve the above purposes, it is indispensable to know the exhaust gas temperature on the upstream side and the downstream side (near the air-fuel ratio sensor 52) of the DPF 42. Therefore, in the present embodiment, a below described temperature estimation model is employed to estimate the exhaust gas temperature (hereinafter, indicated as a DPF downstream temperature Tre) on the downstream side of the DPF 42 based on the exhaust gas temperature (hereinafter indicated as, a DPF upstream temperature Trf) on the of the DPF 42 detected by the exhaust gas temperature sensor 51. In other words, the temperature estimation model estimates a first exhaust gas temperature Tre on the downstream side of the DPF 42 (exhaust gas purifying device) based on a second exhaust gas temperature Trf on the upstream side of the DPF 42 sensed by the exhaust gas temperature sensor 51.

Figure 2:
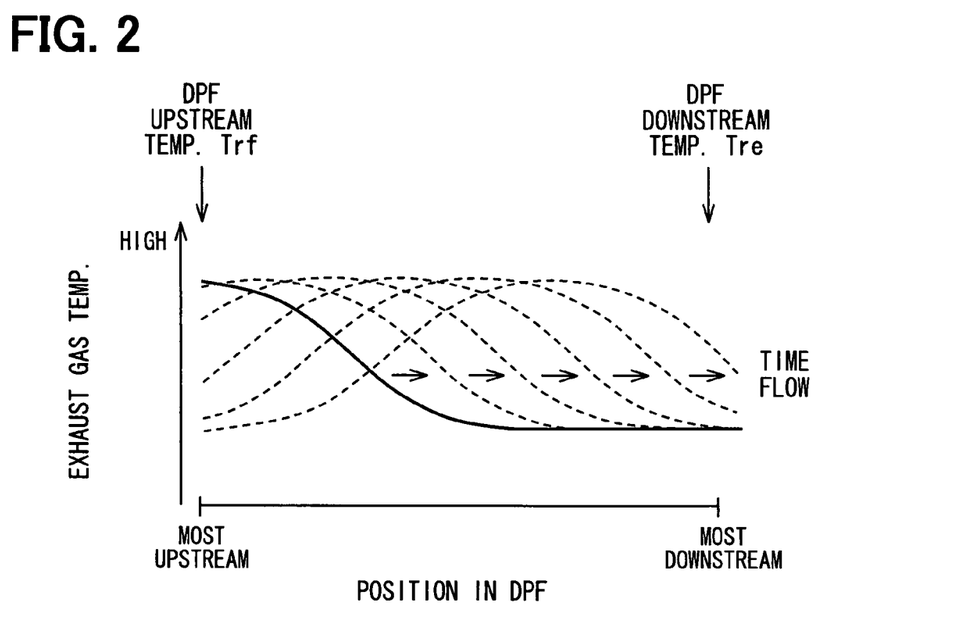
FIG. 2 is a chart showing a distribution of an exhaust gas temperature in a DPF.

FIG. 2 is a chart showing a change of the exhaust gas temperature in the DPF 42. As shown in FIG. 2, the temperature in the DPF 42 is not uniformly distributed, but changes with a time lapse because of a heat transmission. Specifically, a temperature distribution in the DPF 42 at certain timing is indicated by a solid line. When the DPF upstream temperature Trf is high and the DPF downstream temperature Tre is low, downstream-side exhaust gas temperatures become in sequence higher accordingly as time elapses.

The inventor of the present application modeled the heat transmission in the DPF 42 by assuming multiple cells (regions) that correspond to the divided segments of the DPF 42, which are arranged in a flow direction. Here, the DPF 42 is divided into the cells (segments) such that a temperature in each cell is equal to an exhaust gas temperature transmitted to another cell on the downstream side of the cell. As a result, a heat transmission state of each cell can be computed based on a thermal energy, which each cell receives from a cell on the upstream side thereof. In this case, the heat transmission state in each cell depends on the first-order lag based on a relation between a transmission of the thermal energy and a temperature change. Then, in the entire of the DPF 42, the change of the exhaust gas temperature on the downstream side relative to the change of the exhaust gas temperature on the upstream side depends on a transfer function, which is expressed as a plurality of identical first-order lag elements. Here, the number of the plurality of identical first-order lag elements corresponds to the number of divided cells. In other words, by combining the heat transmission state of each cell of the entire of the DPF 42, the transfer function, which indicates the change of the DPF downstream temperature Tre relative to the change of the DPF upstream temperature Trf, can be obtained.

A relation between the transmission of thermal energy in each cell and the change of the exhaust gas temperature can be expressed as follows, when a temperature in the cell on the upstream side of an i-th cell is indicated as $u_{i-1}(t)$, a temperature of the i-th cell is indicated as $y_i(t)$, a heat transmission ratio and a heat capacity of the DPF 42 are indicated as $\alpha[J/(° C.·sec)]$, and $Cd[J/° C.]$, respectively.

$$\alpha(u_{i-1}(t) - y_i(t)) = Cd \frac{d y_i(t)}{dt} \quad \text{equation (1)}$$

When the equation (1) is converted into the following equation (2) based on a state space model.

$$Y_i(s) = \frac{1}{1 + Ts} U_{i-1}(s) \quad \text{equation (2)}$$

Here, in the equation (2), the time constant $$T = \frac{Cd}{\alpha}.$$

As the equation (2) shows, the heat transmission in each cell depends on the transfer function, which is expressed by a first-order lag. Because the DPF 42 is divided into cells such that the temperature of the i-th cell is equal to the exhaust gas temperature in the cell on the downstream side of the i-th cell, the following is satisfied.

$$U_i(s) = Y_i(s) \quad \text{equation 3}$$

Also, the DPF upstream temperature Trf is inputted as a temperature u0 at upstream of a cell, which is located on the most upstream side (i=1) of the DPF 42. When the DPF 42 is assumed to be divided into n cells, the DPF downstream temperature Tre is outputted to serve as an exhaust gas temperature $y_n$ on the most downstream side (i=n) of the DPF 42. Thus, the transfer function, which indicates the change of the DPF downstream temperature Tre relative to the change of the DPF upstream temperature Trf is expressed by n first-order lags (i.e., a number of n sets of the first-order lags).

Figure 3:
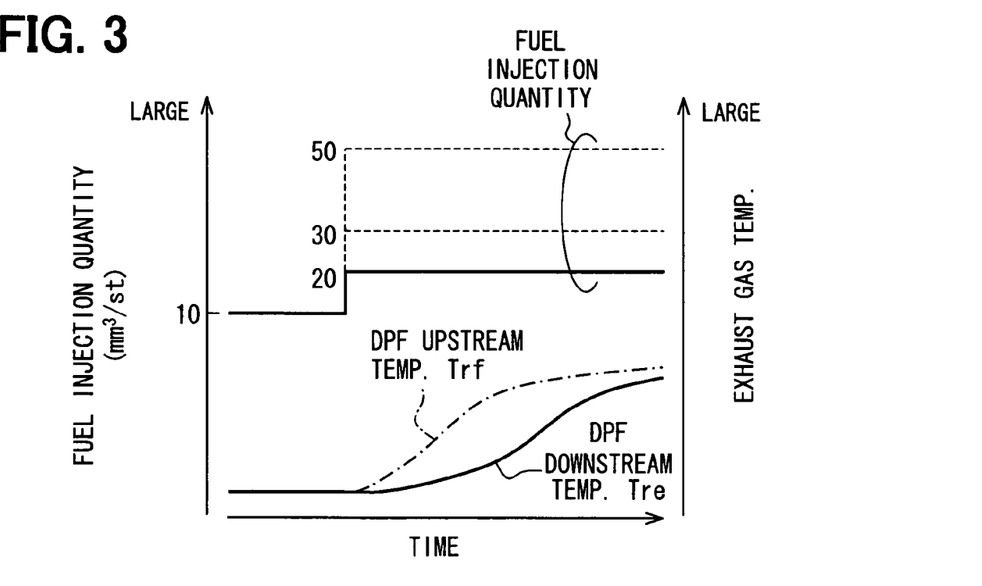
FIG. 3 is a chart used for explanation of a selecting method for selecting an order n and a time constant T for a temperature estimation model.

FIG. 3 is a chart used for explanation of a method for selecting an order n and the time constant T in the temperature estimation model, which is constituted by the above transfer function. FIG. 3 shows an example, in which the fuel injection quantity is changed in order to select the order n and the time constant T. In the present engine control system, in the selection of the order and the time constant, another exhaust gas temperature sensor is provided on the downstream side of the DPF 42 the DPF to detect an actual temperature of the downstream temperature Tre, and the system selects the order n and the time constant T used by the temperature estimation model such that a change state of an estimated temperature computed by the temperature estimation model corresponds to a change state of the actual temperature.

For details, as shown in FIG. 3, the fuel injection quantity is increased stepwise at certain timing. Then, as the fuel injection quantity increases, the DPF upstream temperature Trf increases, and the DPF downstream temperature Tre also increases with delay following the increase of the DPF upstream temperature Trf. In this way, the DPF downstream temperature Tre is changed, and, the order n and the time constant T for the temperature estimation model are selected. In the present embodiment, the order n and the time constant T are selected in accordance with an operational range of the engine 10. Here, regularly used operational ranges of the engine 10 include cases, in which the fuel injection quantity is changed from 10 [mm3/st] to each of 20, 30, 50 [mm3/st] under each engine rotation speed (1000, 1500, 2000, 3000 [rpm]). In each case, the order n and the time constant T for the temperature estimation model are selected.

Figure 4:
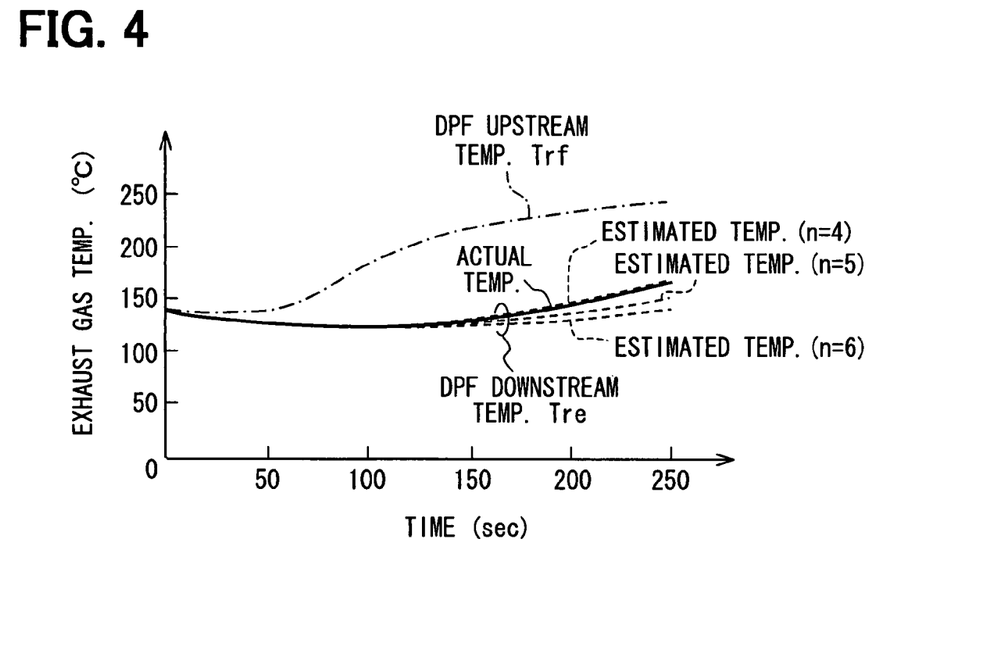
FIG. 4 is an example chart showing a selection process of a order n and time constant T for the temperature estimation model.

FIG. 4 is a chart showing the change states of the actual temperature of the DPF downstream temperature Tre and the estimated temperatures computed by the temperature estimation model when the fuel injection quantity is changed stepwise. In the present embodiment, when the change state of the DPF downstream temperature Tre shown in FIG. 4 is compared with the estimated temperatures computed by the temperature estimation model using the order n of 4, 5, 6, the estimated temperature computed by the temperature estimation model using the order n of 4 generally corresponds to the change state of the actual temperature. In this case, the time constant T is 42.6 [sec]. In this way, the order n and the time constant T, which correspond to the actual temperature of the DPF downstream temperature Tre, are selected. Also, an offset (difference) between the actual temperature of the DPF downstream temperature Tre and the estimated temperature is 10.8[° C.]. This offset indicates various influence, which is not reflected in the transfer function of the temperature estimation model, and indicates, for example, influence of radiation of heat to the atmosphere at an outer periphery of the DPF 42.

In the above described each operational range of the engine 10, as a selecting result of the order n and the time constant T, the estimated temperature of the DPF downstream temperature Tre computed by the temperature estimation model includes a maximum error of a dozen or so % relative to the actual temperature in an EU mode operational state. Here, the EU mode operational state means an operational cycle used for measuring a fuel consumption ratio and exhaust gas emissions in European Union. By selecting the order n and the time constant T for each of more precise operational range of the engine 10, a degree of estimation accuracy for estimating the temperature can be more improved.

Also, in the present embodiment, it is observed that the order n of the temperature estimation model is constant regardless of the operational range of the engine 10. In other words, the order n may be determined depending on a dimension, a material, and a structure of the DPF 42. When the order n is examined using a DPF of a different material, the order n for the DPF is equal to 6, and the order n is constant regardless of the operational range of the engine 10.

Figure 5:
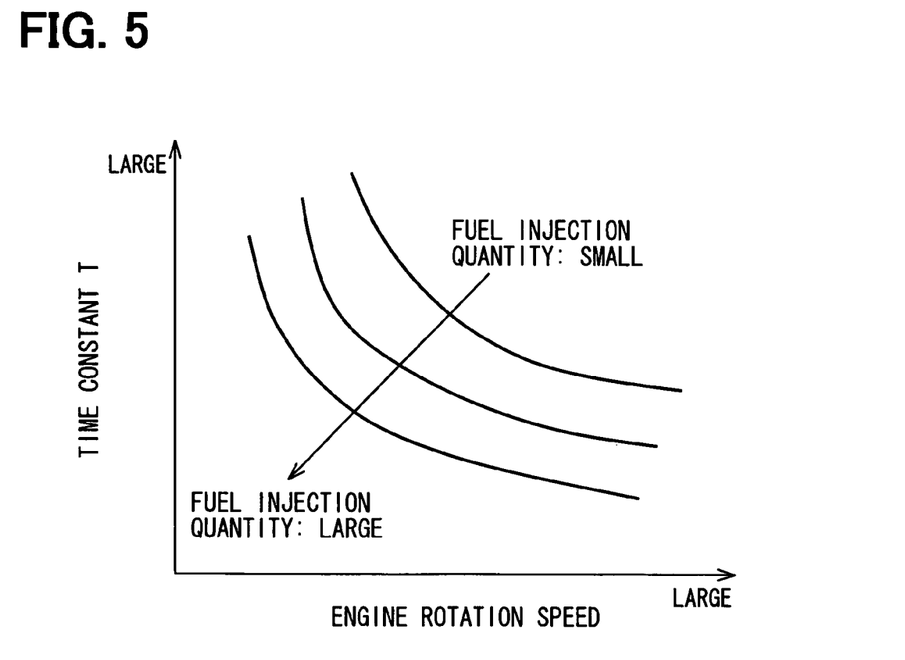
FIG. 5 is a chart showing a relation between an engine rotation speed, a fuel injection quantity, and the time constant.

FIG. 5 is a map showing a relation between the engine rotation speed, the fuel injection quantity, and the time constant T. This map is obtained based on the selecting method for selecting the above time constant T. As shown in FIG. 5, the time constant T becomes smaller as the engine rotation speed becomes larger, and, the time constant T becomes smaller as the injection quantity becomes larger. This is because an exhaust gas flow rate becomes larger as the engine rotation speed and the injection quantity become larger so that a transmission speed as a heat transmission state becomes higher.

Figure 6:
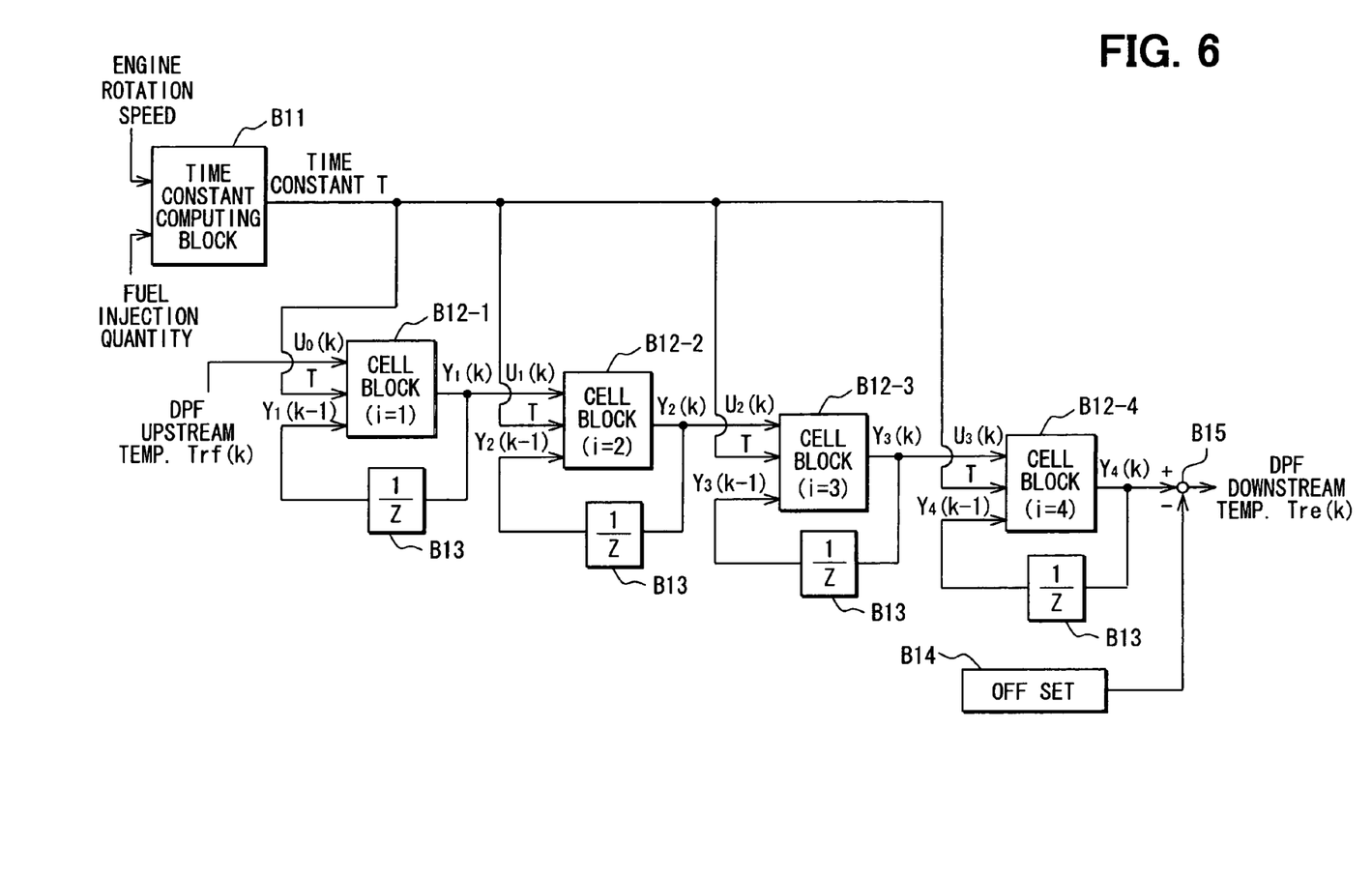
FIG. 6 is a block diagram of the temperature estimation model, which is expressed as a discrete system.

FIG. 6 is a block diagram of the temperature estimation model (the order n=4), in which the DPF 42 is divided into four cells, and which is expressed as a discrete system used for an estimation process in the ECU 60 for estimating the DPF downstream temperature Tre.

In the present temperature estimation model, a time constant computing block BI 1 is a computing block for outputting the time constant T in accordance with the engine rotation speed and the fuel injection quantity at the time by using a predetermined time constant map. The cell blocks B12-1, B12-2, B12-3, and B12-4 indicate heat transmission states of divided four cells, and are computing blocks for computing first-order lags based on the equation (2). The i-th cell block B12-$i$ receives a temperature $U_{i-1}(k)$ of the upstream side of the cell block, the time constant T, and the exhaust gas temperature $Y_i(k-1)$ on the downstream side of the cell block of a previous time (k−1), and outputs an exhaust gas temperature $Y_i(k)$ on the downstream side of the block at a current time (k). The exhaust gas temperature $Y_i(k)$ on the downstream side of the block at the current time (k) is specifically computed as follows.

$$Y_i(k)=U_{i-1}(k)\times T+Y_i(k-1)\times[1-T]\qquad\text{equation (4)}$$

The exhaust gas temperature $Y_i(k-1)$ on the downstream side of the cell block of the previous time (k−1) is computed as $1/z\times Y_i(k)$ by a delay block B13. Also, the cell block B12-1 on the most upstream side (i=1) of the model receives the DPF upstream temperature Trf (k) as a temperature $U_{i-1}(k)$ on the upstream side of the cell block B12-1. Then, a subtracting block B15 subtracts the exhaust gas temperature $Y_4(k)$ on the downstream side of the cell block B12-4, which is on the most downstream side (i=4) of the model, by an output value from an offset block B14 as an offset value such that the DPF downstream temperature Tre (k) is outputted.

Figure 7:
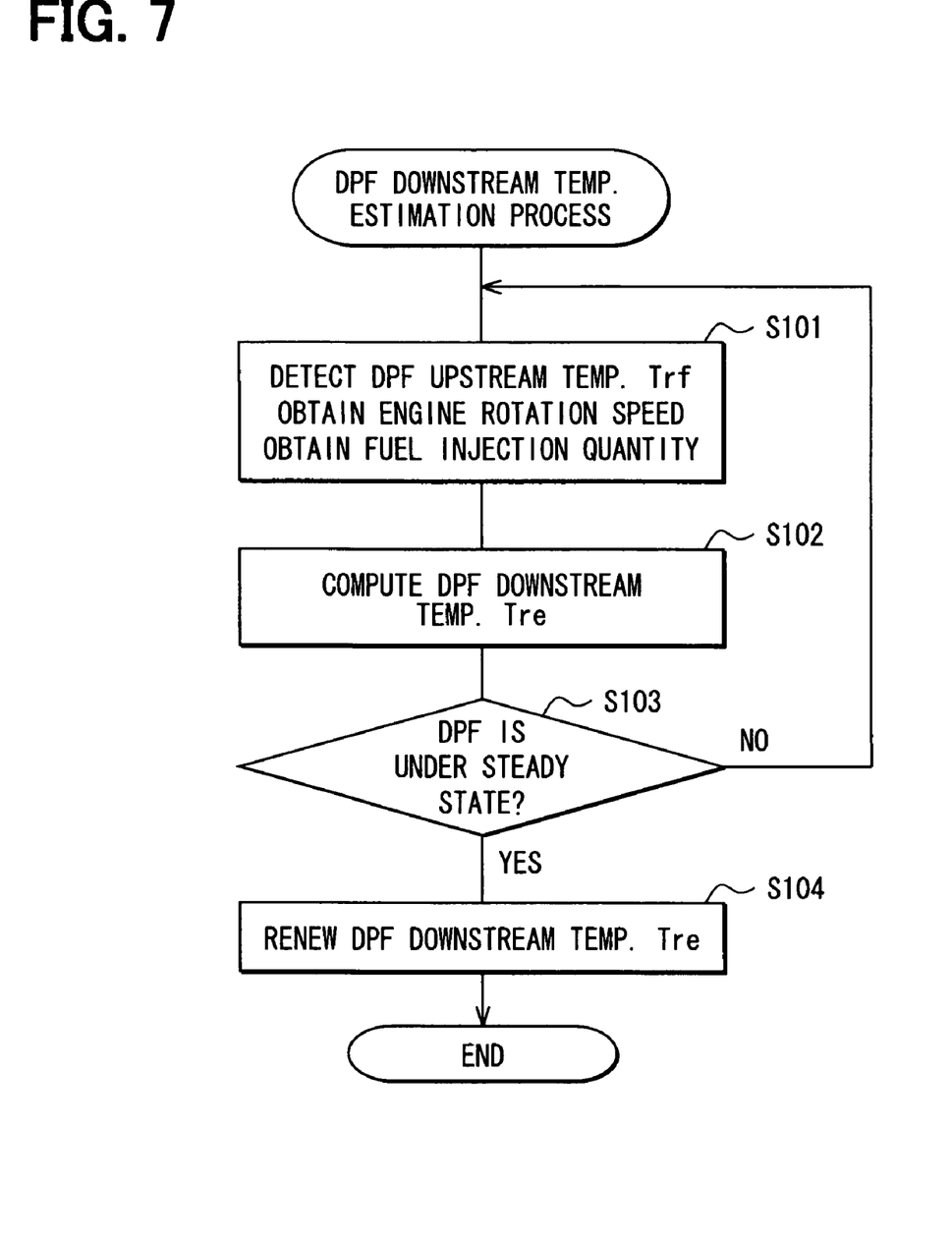
FIG. 7 is a flow chart of a temperature estimation process for estimating a temperature on a downstream of the DPF.

FIG. 7 is a flow chart of the DPF downstream temperature estimation process for estimating the DPF downstream temperature Tre by using the temperature estimation model. In the present embodiment, an estimated value of the DPF downstream temperature Tre is stored in the RAM of the ECU 60, and various controls of the engine 10 uses the stored estimated value. Therefore, in the present process, regularly, the DPF downstream temperature Tre is estimated and renews the stored value in the RAM. Here, the present process is executed by the ECU 60 at predetermined intervals (e.g., one second).

At step S101, the exhaust gas temperature sensor 51 detects the DPF upstream temperature Trf, and the engine rotation speed and the fuel injection quantity are obtained. At step S102, based on each of the obtained operational data, the DPF downstream temperature Tre is computed by using the above temperature estimation model.

At step S103, it is determined whether the DPF 42 is under a steady state or not. Specifically, when the DPF regeneration control is not operated, it is determined that the DPF 42 is under the steady state. This is because the temperature estimation model cannot be applied due to generated heat in the DPF 42 during the DPF regeneration control.

When it is determined that the DPF 42 is under the steady state, at step S104, the DPF downstream temperature Tre is renewed, and then the DPF downstream temperature estimation process is ended. In contrast, when it is determined that the DPF 42 is not under the steady state, control continues with step S101 and the DPF downstream temperature Tre is estimated again.

Figure 8:
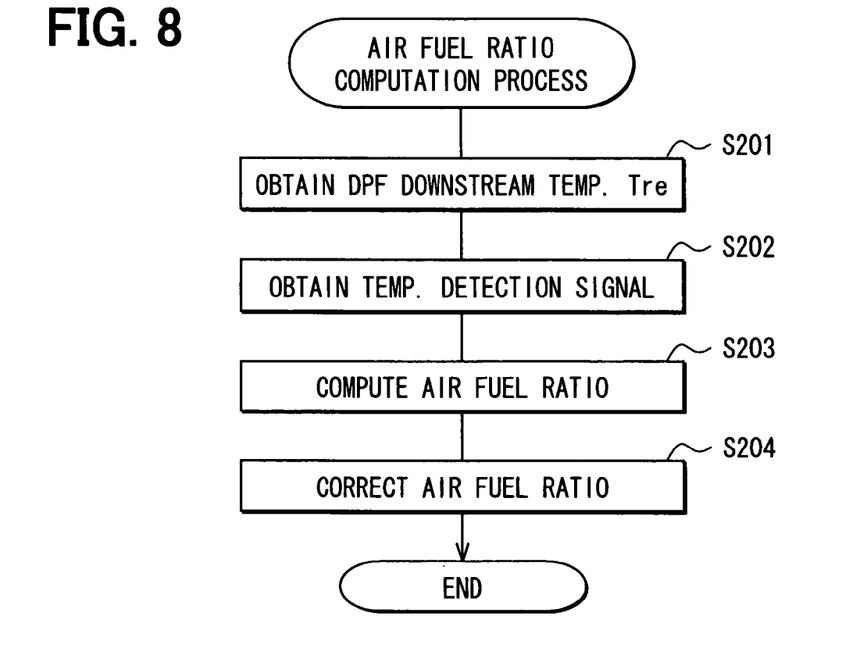
FIG. 8 is a flow chart of an air-fuel ratio computation process.
Figure 9:
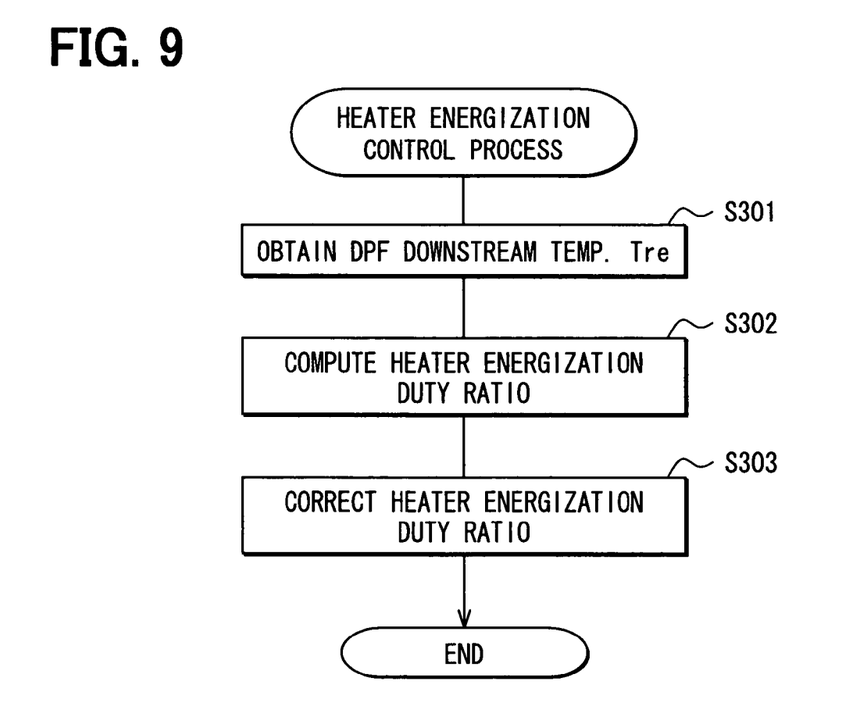
FIG. 9 is a flow chart for a heater energization control process.

FIGS. 8 and 9 show flow charts of processes related to the air-fuel ratio sensor 52. FIG. 8 shows a flow chart of an air-fuel ratio computation process for computing the oxygen concentration (air-fuel ratio) in the exhaust gas, and FIG. 9 shows a flow chart of a heater energization control process for controlling energization of the heater by computing the heater energization Duty ratio. Each of the processes is executed by the ECU 60 at corresponding predetermined intervals.

In the air-fuel ratio computation process shown in FIG. 8, the DPF downstream temperature Tre, which is stored in the RAM, is obtained at step S201. Then, at step S202, a temperature detection signal by the air-fuel ratio sensor 52 is obtained, and at step S203, the air-fuel ratio (the oxygen concentration) is computed based on the obtained temperature detection signal. Then, at step S204, the computed air-fuel ratio is corrected based on the DPF downstream temperature Tre, which acts as the exhaust gas temperature near the air-fuel ratio sensor 52.

In the heater energization control process shown in FIG. 9, the DPF downstream temperature Tre, which is stored in the RAM, is obtained at step S301. Then, at step S302, an energization Duty ratio of the heater is computed. Specifically, an element impedance, which corresponds to the element temperature of the sensor element, is detected, and the heater energization Duty ratio is computed based on a difference between the detected element impedance and a target element impedance, which corresponds to a target activation temperature (750° C.). Then, at step S303, the heater energization Duty ratio is corrected based on the DPF downstream temperature Tre, which acts as the exhaust gas temperature near the air-fuel ratio sensor 52.

According to the above described embodiment, advantages described below will be achieved.

There is prepared the temperature estimation model, which employs the transfer function expressed by a plurality of identical first-order lag elements as a transfer function for indicating the change of the DPF downstream temperature Tre relative to the change of the DPF upstream temperature Trf. The transfer function of the temperature estimation model is obtained logically based on a relation between a transmission of thermal energy and a temperature change in each cell of the DPF 42, and the temperature estimation model can estimate the DPF downstream temperature Tre. Here, the DPF 42 is divided into cells in a flow direction of the exhaust gas.

The time constant T is in advance computed for each operational range of the engine 10, and the time constant T is changeably set (determined) in accordance with each operational data. Therefore, a heat transmission state, which changes with each operational range of the engine 10, can be appropriately expressed, and as a result, the temperature estimation model reliably estimates the DPF downstream temperature Tre. Specifically, compared with a conventional transfer function expressed by "first order lag+dead time" or "n-th order lag+dead time", which are obtained experimentally, the transfer function of the present invention more appropriately indicates behavior of the change of the actual exhaust gas temperature without using the dead time element. Thus, a degree of estimation accuracy of the present invention is advantageously higher. Also, when the transfer function expressed by "n-th order lag+dead time" is used, n sets of time constants need to be obtained. In contrast, in the present invention, because the transfer function of the temperature estimation model is expressed by the plurality of identical first-order lag elements, only one time constant T needs to be selected. Therefore, a process for selecting the time constant T requires a small labor hour (e.g., steps).

Also, the transfer function is used under an assumption of dividing the exhaust gas purifying device (e.g., DPF 42) into cells, it is possible to estimate an exhaust gas temperature for each divided cell. In this way, it is possible to appropriately know a purifying state of the exhaust gas purified by the exhaust gas purifying device.

In the above embodiment, the DPF downstream temperature Tre is computed by the subtraction of the offset value. By this process, the influence of heat radiation to the atmosphere at an outer periphery of the DPF 42 can be considered so that the DPF downstream temperature Tre can be appropriately computed.

The oxygen concentration, which is detected by the sensor element of the air-fuel ratio sensor 52, and the heater Duty ratio are corrected by using the DPF downstream temperature Tre, which is computed by the temperature estimation model. Here, because the element temperature of the sensor element changes with the exhaust gas heat in addition to heat by the heater, the heater energization amount is corrected in accordance with an amount corresponding to the influence by the exhaust gas heat. Therefore, the influence of the exhaust gas heat is compensated, and therefore, the oxygen concentration is accurately detected and the activation state for the sensor element can be appropriately maintained. Also, even though there is not required to provide sensors (e.g., an exhaust gas temperature sensor) for detecting the DPF downstream temperature Tre, the influence of the exhaust gas heat for the air-fuel ratio sensor 52 can be compensated. Thus, this is advantageous for cost reduction.

The stored value in the RAM is not renewed in the DPF regeneration control. Here, in the DPF regeneration control, for example, the accumulated particulates captured by the particulate filter are burned and removed. In the temperature estimation model of the present embodiment, the influence of the change of the heat inside the DPF 42 is not considered. Therefore, due to the above fact that the stored value stored in the RAM is not renewed when the heat is generated, an erroneous estimation of the DPF downstream temperature Tre can be limited.

Here, the present invention is not limited to the above described embodiment, but can be alternatively embodied as follows.

In the above embodiment, in the block diagram of the temperature estimation model shown in FIG. 6, in order to consider the influence, such as the heat radiation to the atmosphere through the outer periphery of the DPF 42, the subtracting block B15 is used to operate the subtraction by the output value from the offset block B14. However, the present invention is not limited to this. Because the heat radiation to the atmosphere through the outer periphery of the DPF 42 is subject to the influence of an atmospheric temperature and a vehicle speed, the output value from the offset block B14 may be alternatively changed (determined) in accordance with the atmospheric temperature and the vehicle speed. By considering the influence, such as the heat radiation to the atmosphere, the DPF downstream temperature Tre based on the temperature estimation model can be more accurately (appropriately) estimated.

In the above embodiment, the time constant T is determined in accordance with the engine rotation speed and the fuel injection quantity, but the present invention is not limited to this. Because the time constant T changes with the exhaust gas flow and the pressure of the exhaust gas, the time constant T may be alternatively determined based on an intake air amount detected by an air flow meter (not shown) provided to the intake system and the engine rotation speed, which act as data relating to the exhaust gas flow and the pressure of the exhaust gas. Also, in a case, where a sensing device for sensing the exhaust gas flow is provided to the exhaust pipe 31, the time constant T may be alternatively determined based on the exhaust gas flow sensed by the sensing device.

In the above embodiment, as the compensation of the influence for the air-fuel ratio sensor 52 by the exhaust gas heat, the detected value of the oxygen concentration and the heater energization Duty ratio are corrected. However, the present invention is not limited to this. In a conventional art, when the engine 10 is stared in the cold (i.e., when a cold start is made), the moisture in the exhaust gas may be condensed to generate the condensed water, and if the condensed water is applied to the sensor element, which is heated by the heater, the sensor element may be disadvantageously broken. Therefore, in a modification of the present invention, determination of a wet-and-dry state based on the exhaust gas temperature is operated to permit or not permit the energization of the heater in accordance with the determination result. Specifically, it can be determined whether the condensed water is generated in the exhaust pipe 31 based on the atmospheric temperature and the DPF downstream temperature Tre, and when it is determined that the condensed water is generated, the heater energization is inhibited. By the above process, the sensor element can be limited from breaking due to being subject to the condensed water. Therefore, the sensor element can be protected.

In the above embodiment, the exhaust gas temperature sensor 51 is provided on the upstream side of the DPF 42, and the exhaust gas temperature sensor 51 senses the DPF upstream temperature Trf. Also, the DPF downstream temperature is estimated using the temperature estimation model. However, the present invention is not limited to this. An exhaust gas temperature sensor may be alternatively provided on the downstream side of the DPF 42 in place of the exhaust gas temperature sensor on the upstream side thereof. Then, the DPF downstream temperature Tre is sensed by the exhaust gas temperature sensor, and the DPF upstream temperature Trf can be estimated by a temperature estimation model, which includes an inverse transfer function of the above transfer function.

In the above embodiment, the DPF 42 is targeted (described) as an exhaust gas purifying device, but the present invention is not limited to this. The DOC 41 and a NOx catalytic converter for purifying the NOx may be alternatively targeted, and a combination of the DOC 41 and the NOx catalytic converter may be alternatively targeted.

In the above embodiment, the air-fuel ratio sensor 52 is targeted (described) as a gas sensor for sensing the oxygen concentration (air-fuel ratio) in the exhaust gas, but the present invention is not limited to this. A sensing device for sensing a concentration of gas (e.g., NOx, CO, HC) in the exhaust gas may alternatively serve as the gas sensor.

In the above embodiment, the diesel engine is targeted (describe), but the present invention is not limited to this. In a gasoline engine system, a temperature estimation model can be also provided and an exhaust gas temperature can be estimated by the temperature estimation model.

Additional advantages and modifications will readily occur to those skilled in the art. The invention in its broader terms is therefore not limited to the specific details, representative apparatus, and illustrative examples shown and described.

What is claimed is:

1. A control system for an internal combustion engine comprising:
   an exhaust gas purifying device provided to an exhaust duct of the internal combustion engine;
   an exhaust gas temperature sensor provided in the exhaust duct on an upstream side of the exhaust gas purifying device;
   temperature estimating means for estimating a first exhaust gas temperature on a downstream side of the exhaust gas purifying device through a transfer function, which is expressed by a plurality of identical first-order lag elements, based on a second exhaust gas temperature on the upstream side of the exhaust gas purifying device sensed by the exhaust gas temperature sensor;
   a gas sensor that is provided in the exhaust duct on the downstream side of the exhaust gas purifying device, the gas sensor including a sensor element part, which senses a concentration of a specified component in exhaust gas, and a heater, which heats the sensor element part, wherein an energization control of the heater for energizing the heater is performed in order to maintain the sensor element part under an activation state; and
   compensating means for compensating influence of exhaust gas heat to the gas sensor based on the first exhaust gas temperature estimated by the temperature estimating means, wherein the compensating means corrects at least one of the sensed concentration sensed by the sensor element part and an energization amount for energizing the heater in the energization control of the heater in order to compensate the influence of the exhaust gas heat to the gas sensor.

2. The control system according to claim 1, further comprising time constant determining means for determining a time constant for the first-order lag elements of the transfer function in accordance with an operational state of the internal combustion engine.

3. The control system according to claim 1, wherein the transfer function is expressed by an offset element and the plurality of first-order lag elements.

4. The control system according to claim 1, wherein the temperature estimating means is inhibited from estimating the first exhaust gas temperature when heat is generated in the exhaust gas purifying device.

5. The control system according to claim 1, wherein:
   the exhaust gas temperature sensor is provided on the downstream side of the exhaust gas purifying device instead of the upstream side thereof for sensing the first exhaust gas temperature; and
   the temperature estimating means estimates the second exhaust gas temperature on the upstream side of the exhaust gas purifying device based on the first exhaust gas temperature on the downstream side thereof sensed by the exhaust gas temperature sensor by using an inverse transfer function of the transfer function.

6. A method of controlling an internal combustion engine, the method comprising:
   providing an exhaust gas purifying device to an exhaust duct of the internal combustion engine;
   providing an exhaust gas temperature sensor in the exhaust duct on an upstream side of the exhaust gas purifying device;
   estimating a first exhaust gas temperature on a downstream side of the exhaust gas purifying device through a transfer function, which is expressed by a plurality of identical first-order lag elements, based on a second exhaust gas temperature on the upstream side of the exhaust gas purifying device sensed by the exhaust gas temperature sensor;
   providing a gas sensor in the exhaust duct on the downstream side of the exhaust gas purifying device, the gas sensor including a sensor element part, which senses a concentration of a specified component in exhaust gas, and a heater, which heats the sensor element part, wherein controlling energization of the heater for energizing the heater is performed in order to maintain the sensor element part under an activation state; and
   compensating influence of exhaust gas heat to the gas sensor based on the first estimated exhaust gas temperature, wherein the compensating includes correcting at least one of the sensed concentration sensed by the sensor element part and an energization amount for energizing the heater in the controlling energization of the heater in order to compensate the influence of the exhaust gas heat to the gas sensor.

7. The method according to claim 6, further comprising determining a time constant for the first-order lag elements of the transfer function in accordance with an operational state of the internal combustion engine.

8. The method according to claim 6, wherein the transfer function is expressed by an offset element and the plurality of first-order lag elements.

9. The method according to claim 6, wherein estimating the first exhaust gas temperature is inhibited when heat is generated in the exhaust gas purifying device.

* * * * *